United States Patent [19]

Moriya

[11] Patent Number: 4,553,787

[45] Date of Patent: Nov. 19, 1985

[54] VEHICLE DECELERATION SENSING TYPE TWO-SYSTEM LIQUID PRESSURE CONTROL VALVE

[75] Inventor: Michio Moriya, Hyogo, Japan

[73] Assignee: Sumitomo Electric Industries, Ltd., Japan

[21] Appl. No.: 555,924

[22] Filed: Nov. 29, 1983

[51] Int. Cl.[4] .............................................. B60T 8/26
[52] U.S. Cl. .................................................... 303/6 C
[58] Field of Search .................... 303/6 C, 6 R, 24 A, 303/24 C, 24 F, 84 R

[56] References Cited

U.S. PATENT DOCUMENTS

| | | | |
|---|---|---|---|
| 4,273,386 | 6/1981 | Farr | 303/6 C |
| 4,322,115 | 3/1982 | Yoshino | 303/6 C |

Primary Examiner—Duane A. Reger

Attorney, Agent, or Firm—Sughrue, Mion, Zinn, Macpeak and Seas

[57] ABSTRACT

A vehicle deceleration sensing type dual braking system brake fluid pressure control valve used to maintain even braking pressure in the event of failure of one of the braking systems and which automatically sets a crossover pressure in dependence upon the load on the vehicle. Two reducing valve mechanisms are arranged coaxially within a valve body, with two plungers extending outwardly from a hollow liquid-pressure-operated piston. A spring pushes the plungers apart. Another liquid-pressure-operated piston, disposed coaxially with the two plungers, receives the outward end of one of the pistons. A chamber on the outward side of this liquid-pressure-operated piston is communicated with an inertial value used to sense the deceleration of the vehicle.

6 Claims, 1 Drawing Figure

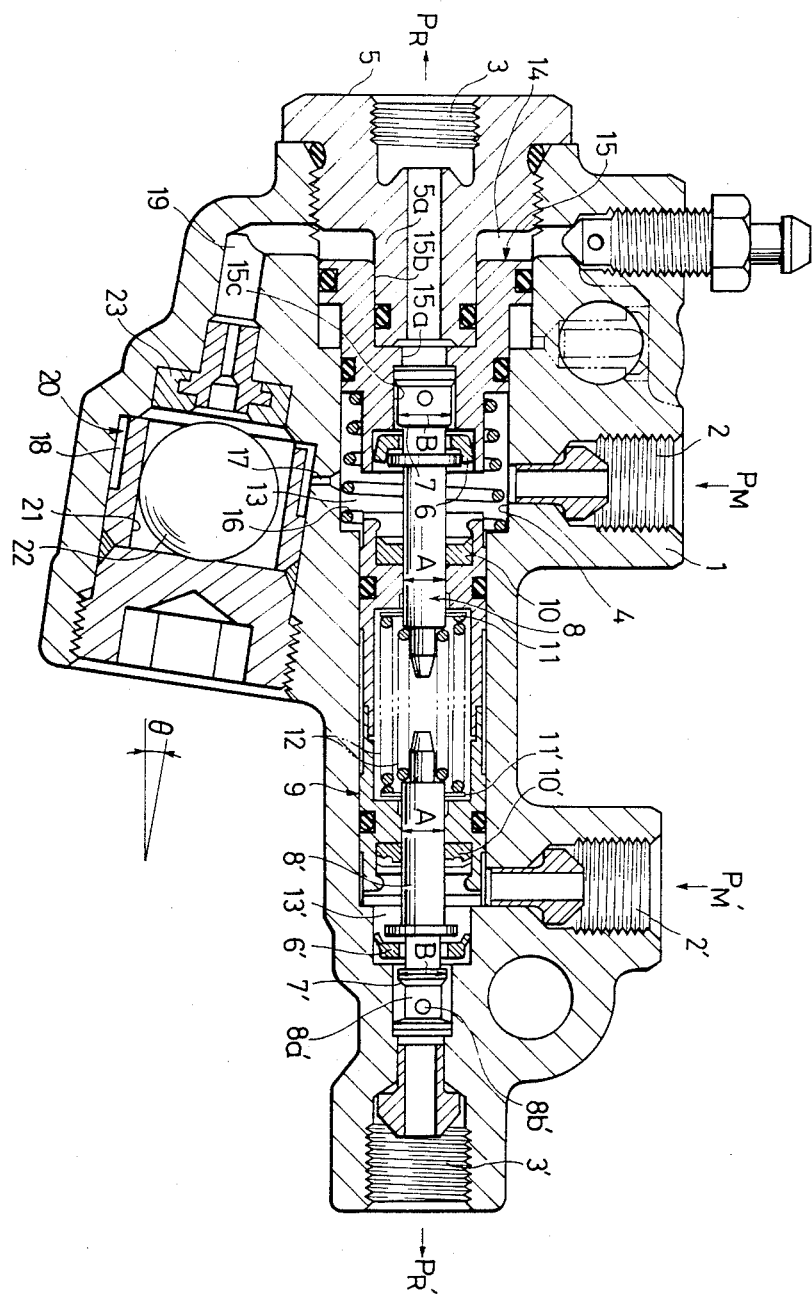

4,553,787

VEHICLE DECELERATION SENSING TYPE TWO-SYSTEM LIQUID PRESSURE CONTROL VALVE

BACKGROUND OF THE INVENTION

The present invention relates to a liquid pressure control valve adapted to be used with a liquid pressure type braking device. More particularly, the invention relates to a vehicle deceleration sensing type two-system liquid pressure control valve which senses the deceleration of a vehicle and automatically sets a crossover liquid pressure according to a variable load on the vehicle.

In order to suitably apply braking forces to the front and rear wheels of a vehicle, especially to those of an automobile, a liquid pressure control valve is provided in the liquid pressure circuit of the rear wheel brakes. In order to make the actual front and rear wheel braking force distribution ratio close to the ideal distribution ratio, it is desirable for the liquid pressure control valve to be able to vary the crossover liquid pressure according to the load on the vehicle, which, of course, is variable. Control valves of this type known in the art include a load response type control valve, which detects the relative displacement of the vehicle body and an axle or the like to change the crossover liquid pressure (or pressure-reducing-action start pressure), and a deceleration sensing type control valve which changes the crossover liquid pressure upon sensing a predetermined magnitude of deceleration.

On the other hand, FF (front engine, front wheel drive) vehicles, which have become popular recently, employ for safety purposes a so-called "diagonal split type brake system" The outlet of the master cylinder is divided into two systems, and one of the two systems is coupled to the right front wheel and the left rear wheel, while the other to the left front wheel and the right rear wheel. It is desirable for a control valve employed in this system to have a so-called "fault compensating function" in order to fully utilize the braking force in which, when one system is faulty, the pressure reducing action of the operable system is stopped so that the input liquid pressure is applied to the rear wheel brakes directly.

A deceleration sensing type liquid pressure control valve disclosed, for instance, by Japanese Published Patent Application No. 18421/1981 requires no link mechanism. Therefore, it is small in size, light in weight and low in manufacturing cost compared with a load response type liquid pressure control valve. However, in the case where a deceleration sensing type liquid pressure control valve is coupled to a two-system braking circuit, it is necessary to provide a deceleration sensing valve (inertial valve) and a piston for adjusting the compression of a control spring for each of the two liquid pressure systems. Therefore, in this case, it is rather difficult to reduce the size and weight of the valve body and to reduce its manufacturing cost.

For two-system liquid pressure control with this type of valve, the control pistons are depressed by respective springs. However, it is considerably difficult to make the loads of the two springs uniform, and therefore a liquid pressure difference occurs between the two systems, with the result that the braking forces are liable to be unbalanced.

Many other deceleration sensing type two-system liquid pressure control valves are known in the art. However, most of them are intricate in construction and accordingly high in manufacturing cost, and moreover have no compensating function.

In view of the foregoing, an object of the present invention is to provide a deceleration sensing type two-system liquid pressure control valve which is small in size, light in weight, low in manufacturing cost and high in performance.

SUMMARY OF THE INVENTION

The foregoing and other objects of the invention have been achieved by the provision of a deceleration sensing type two-system liquid pressure control valve which, according to the invention, includes two reducing valve mechanisms having valve seats at opposed ends, and a set spring disposed between the plungers of the two reducing valve mechanisms in such a manner as to move the plungers away from each other, and a liquid-pressure-operated piston which, as the sealed liquid pressure of a liquid seal chamber is increased by an inertial valve provided in a liquid pressure path of one system, is moved by one of the plungers of the reducing valve mechanism to vary the length of the set spring so that equal spring forces are applied to the two plungers at all times.

BRIEF DESCRIPTION OF THE DRAWING

The single FIGURE in the accompanying drawing is a sectional view showing an example of liquid pressure control valve according to the invention.

DESCRIPTION OF THE PREFERRED EMBODIMENTS

The invention will now be described with reference to preferred embodiment shown in the accompanying drawing.

As shown in the single drawing figure, a valve body 1 has two input ports 2 and 2', an output port 3' (to be connected to a rear wheel brake cylinder), and a shouldered cylinder 4. Another output port 3, communicated with the input port 2, is formed in a plug 5 which closes the opening end of the cylinder 4. In the cylinder 4, reducing valve mechanisms composed of lip seals 6 and 6', serving as valve seats, and plungers 8 and 8', performing pressure reducing actions with valves heads 7 and 7' abutted against the seals, respectively, are arranged in opposed directions. A liquid sealing second hollow piston 9 is positioned between the plungers 8 and 8'. The rear end portions of the plungers 8 and 8' are liquid-tight and slidably supported by the second piston 9 through respective cup seals 10 and 10'. Spring retainers 11 and 11' are fixedly secured to the rear end portions of the plungers 8 and 8', respectively, inside the second piston 9. A set spring 12 is provided between the two retainers 11 and 11' so that the plungers 8 and 8' are pushed away from each other.

A piston 15 is disposed between the plug 5 and the second piston 9. One end portion of the piston 15 is communicated with one input liquid pressure chamber 13, and the other end portion is communicated with a liquid seal chamber 14. An inertial valve (described below) is also in communication with the chamber 14. The piston 15 has a pressure receiving area on the side of the liquid seal chamber larger than that on the side of the input liquid pressure chamber, and the piston is urged towards the plug 5 by a spring 16 provided in the input liquid pressure chamber 13. The piston 15 has a liquid passage 15a communicated with the output port 3. The passage 15a and the liquid seal chamber 14 are sealed liquid tight by a protrusion 5a of the plug 5 into a cylindrical recess 15b of the piston 15. The piston 15 has a shouldered hole 15c into which the lip seal 6 and the end portion of the plunger 8 are inserted.

An inertial valve 20, adapted to control the sealed liquid pressure in the liquid seal chamber 14, is provided in a valve chamber 18 communicated with the input liquid pressure chamber 13 through a passage 17. The inertial valve is a conventional one. The inertial valve includes a ball valve 22 which is guided by a guide surface 21 forming an angle $\theta$ (in elevation) with the direction of movement of the vehicle, and a valve seat 23. When a deceleration reaches a predetermined value, the ball 22 is moved to the valve seat, thus disconnecting a passage 19 on the side of the liquid seal chamber from the valve chamber 18.

The plunger 8' described above is so designed that when a liquid pressure system connected to the inertial valve is faulty, a passage for communicating the input and output liquid pressure chambers with each other is provided between the plunger 8' and the lip seal 6'. In other words, an inserting part 8a' smaller in diameter than the inside diameter hole of the seal 6' is provided in front of the valve head 8', and one of a through-hole 8b', which extends to the plunger end face, is opened into the cylindrical surface of the inserting part 8a'. When the plunger 8' is moved leftwardly in the figure to the point where the valve head 7' passes through the seal 6', the input liquid flows through a gap formed between the seal 6' and the inserting part 8a' and through the hole 8b' to the output port.

If one end of the hole 8b' is so positioned as to pass through the seal 6', or a groove is cut in the cylindrical surface of the plunger extending from the position where it passes through the seal to the front end face of the plunger, then the inserting part 8a' may be made equal in diameter to the valve head. The plunger 8' will work satisfactorily without the inserting part for reasons which will become apparent later. The pressure reducing function is obtained even if the inserting part of the plunger 8 is eliminated.

The operation of the above-described control valve will now be described.

When the two systems are normal, the input liquid pressures $P_M$ and $P_M'$ are equal to each other ($P_M = P_M'$). When a braking operation is started, that is, when the liquid pressure is lower than a crossover liquid pressure $P_S$ determined by the spring 12, the plungers 8 and 8' and the second piston 9 are positioned as shown in the FIGURE, and the liquid supplied from the master cylinder is introduced through the ports 2 and 2' into the input liquid pressure chambers 13 and 13', and then to the output ports 3 and 3' through the passages formed by the plungers and the lip seals. At the same time, the liquid supplied from the chamber 13 flows through the inertial valve chamber to the liquid seal chamber 14. Accordingly, as the liquid pressure increases, the force pushing the piston 15 to the right and the force bringing the plungers 8 and 8' towards each other are gradually increased.

When the piston 15 is at rest, the plunger 8 operates as follows: When a force $P_M A$ (in the right-hand direction) overcomes the set load $F_1$ of the spring 12 as the input liquid pressure is increasing, the plunger is moved rightwardly so that the valve head 7 abuts against the seal 6 to block the passage. In this case, if the sliding resistance of the plunger and the increase of the spring force are disregarded, then the balance of forces acting on the plunger in the longitudinal direction is as follows:

$$P_R B = P_M(B - A) + F_1,$$

where $P_R$ is the output liquid pressure. On the other hand, the crossover liquid pressure can be represented by $F_1/A$ because $P_S = P_M = P_R$.

If the input liquid pressure is increased by $\Delta P_M'$ then $$P_R B < (P_M + \Delta P_M) \cdot (B - A) + F_1.$$

The plunger 8 is thus displaced slightly leftwardly, and the passage between the valve head and the lip seal is opened. When the output liquid pressure is increased by $\Delta P_R$ thereby, $$(P_R + \Delta P_R)B > (P_M + \Delta P_M)(B - A) + F_1.$$

The valve head then abuts against the seal 6 again, thus blocking the passage. The above-described operation is repeatedly carried out to reduce the pressure. This description is similarly applicable to the right-hand valve mechanism.

When the following condition is satisfied, the piston 15 moves rightwardly while pushing the plunger 8 and stops when the deceleration of the vehicle reaches a predetermined value and the valve seat 23 is closed by the ball 22:

$$P_M \cdot D > P_M \cdot C + F_1 + F_2,$$

where C is the pressure receiving area on the side of the input liquid pressure chamber 13, D is the pressure receiving area on the side of the liquid seal chamber 14, and $F_2$ is the elastic force of the spring 16. In this case, the balance of forces acting on the piston 15 can be represented as follows:

$$P_M D = P_M C + (F_1 + l_1 K_1) + (F_2 + l_1 K_2),$$

where $l_1$ is the amount of movement of the piston, $K_1$ is the elastic constant of the spring 12, and $K_2$ is the elastic constant of the spring 16. As is apparent from this expression, the force of depression of the spring 12 is increased substantially in proportion to the movement of the piston 15. Accordingly, the actual crossover liquid pressure $P_S$ is represented by $(F_1 + l_1 \cdot K_1)A$. In this case, as the value $l_1$ is substantially proportional to the sealed liquid pressure in the liquid seal chamber 14, which varies with the load of the vehicle, the crossover liquid pressure $P_S$ is set according to the load, and the plunger 8 is repeatedly moved to and from the lip seal 6 held at that position.

Control of the crossover liquid pressure $P_S$ should be effected for variations of vehicle load ranging from zero to the maximum. Therefore, the loads and the elastic constants of the springs 12 and 16 should be so determined that the crossover liquid pressure for no load is obtained when the movement of the piston 15 is zero and the crossover liquid pressure for maximum load is obtained when the movement of the piston 15 is a maximum (full stroke).

The operation of the control valve in the case where the liquid pressure system connected to the inertial valve is faulty will now be described. In this case, $P_M = 0$. Therefore, the plunger 8' and the second piston 9 are pushed rightwardly only by the load $F_1$ of the spring 12. Accordingly, when $P_M'$ increases to the point that the force of pushing the two elements 8' and 9 leftwardly is greater than the load $F_1$, the second piston 9 is moved leftwardly while compressing the spring 12 until it abuts against the piston 15. This movement is transmitted through the retainer 11' to the plunger 8' so that the plunger 8' is also moved leftwardly. In this operation, the valve head 7' passes through the inside diameter hole of the seal 6' so that the input and output liquid pressure chambers are communicated with each other through the gap formed between the inserting part 8a' and the seal, and the hole 8b'. Therefore, even when the input liquid pressure $P_M$ becomes higher than the crossover liquid pressure for normal operation, no pressure reducing action is carried out, and the relation $P_M' = P_R'$ is maintained.

If the right-hand liquid pressure system becomes faulty, the passage 19 is closed by the inertial valve 20 with a delay. Therefore, the sealed liquid pressure in the liquid seal chamber 14 is increased, and the value $P_S$ is also increased. Accordingly, a sufficiently high braking force can be obtained without forcibly moving the plunger.

As is apparent from the above description, according to the invention, one of the plungers of the two reducing valve mechanisms, which are arranged in a line opposing one another, is operated in association with the piston inserted into the liquid seal chamber by the inertial valve so that the length of the set spring provided between the plungers of the two reducing valve mechanisms is changed, whereby elastic forces equal in magnitude are applied to the two plungers. Therefore, the liquid pressure difference between the two systems is considerably small, and the braking force is distributed in good balance.

In accordance with the invention, each system need only have one inertial valve and one set spring load adjusting piston. Therefore, the valve body can be made small in size, and light in weight, and the manufacturing cost thereof can be reduced.

When the braking liquid system with the inertial valve is faulty, the liquid-pressure-operated piston is moved from the side of the operable system to the side of the faulty system so that the plunger of the reducing valve on the side of the operable system is moved to the side of the faulty system, whereby the input liquid pressure is directly outputted. Accordingly, whichever of the system is faulty, the braking force is sufficiently high, greatly contributing to the safety of the vehicle.

A variety of techniques is possible for, when one of the two systems is faulty, moving the plunger on the side of the operable system towards the side of the faulty system so that the input liquid pressure is directly outputted. Hence, the invention is not limited to the above-described emobidment.

I claim:

1. A vehicle deceleration sensing type two-system liquid pressure control valve, comprising:
    two liquid pressure systems, each having a liquid pressure path;
    two reducing valve mechanisms arranged coaxially in a valve body, said mechanisms having valve seats at opposed ends;
    a set spring disposed between plungers of said two reducing valve mechanisms in such a manner as to move said plungers away from each other;
    an inertial valve communicating with a liquid pressure path of one of said two systems; and
    a liquid-pressure-operated piston which, as a sealed liquid pressure of a liquid seal chamber is increased by said inertial valve, moves one of said plungers of said reducing valve mechanisms to vary the length of said set spring.

2. The vehicle deceleration sensing type two-system liquid pressure control valve as claimed in claim 1, wherein said valve comprises:
    a second liquid-pressure-operated piston which, when said system having said inertial valve becomes faulty, is moved from the side of the operable system towards the side of the faulty system so that said plunger of said reducing valve mechanism on the side of the operable side is moved towards the side of the faulty system, thereby to prevent a pressure reducing action on the side of the operable system.

3. The vehicle deceleration sensing type two-system liquid pressure control valve, comprising:
    two liquid pressure systems, each having a liquid pressure path;
    two reducing valve mechanisms arranged coaxially in a valve body, said mechanisms having valve seats at opposed ends;
    a set spring disposed between plungers of said two reducing valve mechanisms in such a manner as to move said plungers away from each other;
    an inertial valve communicating with a liquid pressure path of one of said two systems;
    a liquid-pressure-operated piston which, as a sealed liquid pressure of a liquid seal chamber is increased by said inertial valve, moves one of said plungers of said reducing valve mechanisms to vary the length of said set spring; and
    a second liquid-pressure-operated piston which, when said system having said inertial valve becomes faulty, is moved from the side of the operable system towards the side of the faulty system so that said plunger of said reducing valve mechanism on the side of the operable side is moved towards the side of the faulty system, thereby to prevent a pressure reducing action on the side of the operable system,
wherein said second liquid-pressure-operated piston is hollow, and said pistons extend through openings in opposite ends of said second liquid-pressure-operated piston.

4. The vehicle deceleration sensing type two-system liquid pressure control valve of claim 3, wherein each of said pistons is provided with a lip seal at an outward end thereof.

5. The vehicle deceleration sensing type two-system liquid pressure control valve of claim 3, wherein each of said pistons has formed therein at an outward end thereof, beyond said lip seal, a hole extending through said piston in a direction perpendicular to a longitudinal axis of said valve.

6. The vehicle deceleration sensing type two-system liquid pressure control valve of claim 2, further comprising a second spring urging said first-mentioned liquid-pressure-operated piston away from said one of said plungers.

* * * * *